May 7, 1957 F. GUIDOBALDI 2,791,440
ROAD VEHICLE TILTING INWARDLY IN CURVES
Filed June 15, 1953 2 Sheets-Sheet 1
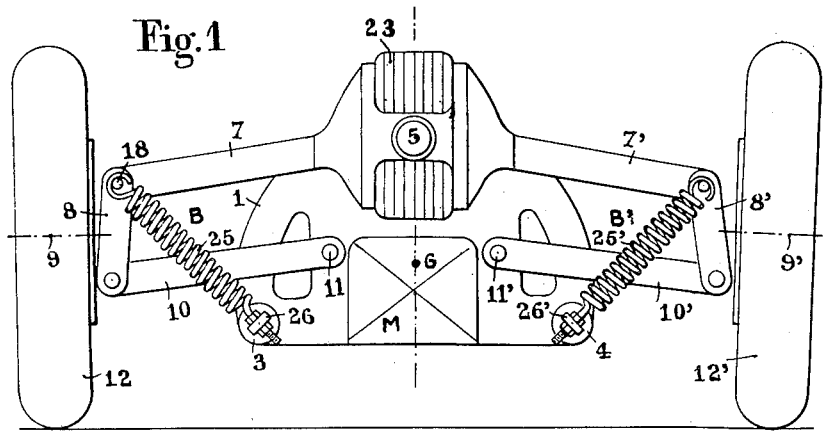
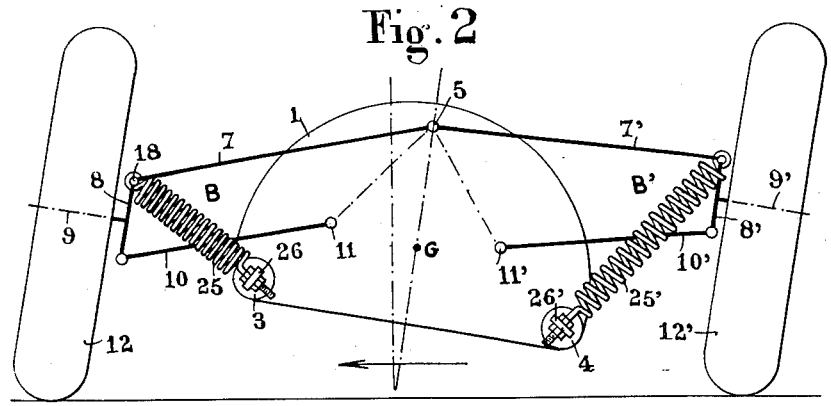
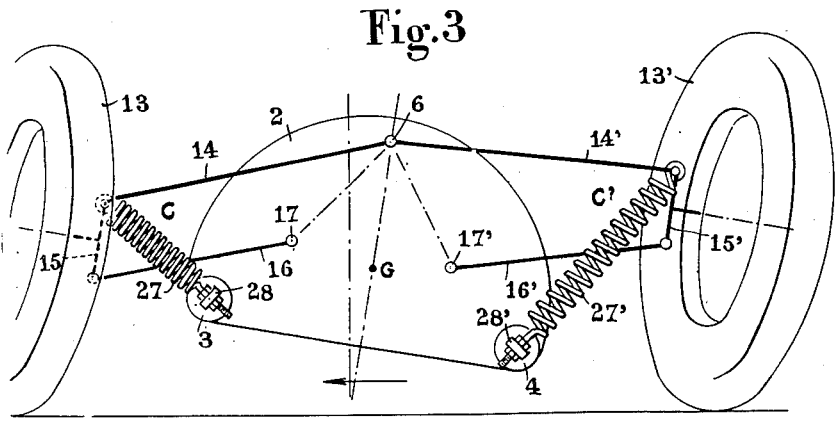
INVENTOR:
FRANCOIS GUIDOBALDI
BY

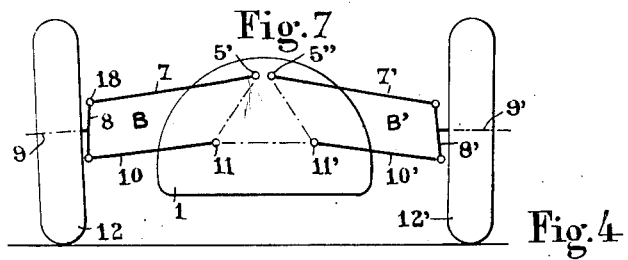
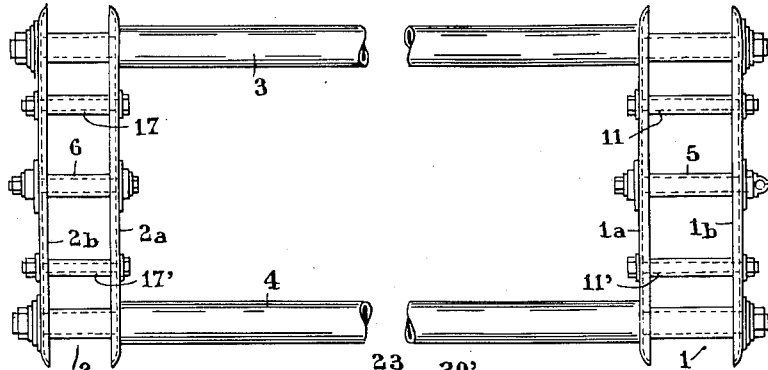
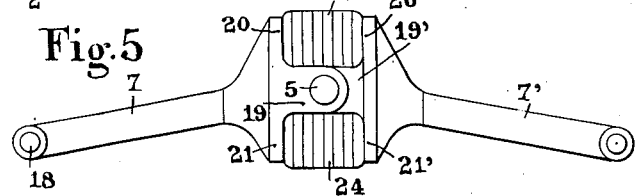
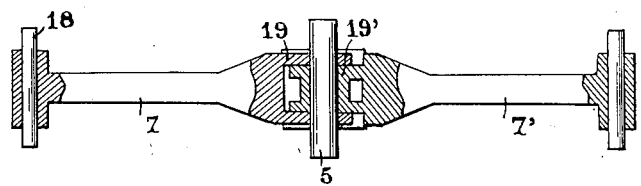

2,791,440

ROAD VEHICLE TILTING INWARDLY IN CURVES

François Guidobaldi, Antibes, France

Application June 15, 1953, Serial No. 361,754

2 Claims. (Cl. 280—112)

This invention relates to vehicles on wheels and more particularly to improvements applicable to vehicles propelled mechanically at relatively high speed such as automobiles, with a view to improving their road stability in curves.

When a vehicle is driven along a curve the centrifugal force thus developed tends not only to project it to the outer periphery of the curve but also to produce a tilting torque whereby the vehicle body tends to assume a certain outward inclination relative to the plane of the road. This last-mentioned effect is due to the fact that on modern vehicles the flexible suspension members are always disposed a substantial distance beneath the centre of gravity of the suspended mass.

In order to counteract these two tendencies, of which the inconveniences are well known, means interconnected with the steering mechanism have already been proposed which tend on the one hand to incline the wheels toward the centre of the turning circle or curve and, on the other hand, to incline the suspended mass of the vehicle in the same direction. However, although the principle on which these solutions are based is sound in itself, the practical embodiments proposed are absolutely inadequate due to the strain required for actuating the mechanisms which are to provide the desired results. It is true that suggestions have been made to interpose servomotors between the driver-actuated controls and these mechanisms, but obviously this solution is attended by such intricacies that it has never been carried out effectively in the practice.

In the vehicle proposed by the present invention it is also aimed at inclining the wheels and the suspended mass toward the centre of the turning circle, but these results are obtained automatically through the very action exerted by the centrifugal force on this mass, and in addition the centre of gravity of the whole vehicle can be positioned very low, with the result that the tilting torque mentioned hereabove can be reduced to a substantial extent.

According to this invention the vehicle is characterized in that its chassis, carrying the heavy components, notably the engine, transmission, final drive, body, etc., is pivotally mounted in pendular fashion relative to both sets of wheels about a longitudinal axis consisting of a pair of longitudinal end pivot pins positioned in axial alignment with respect to each other, in the longitudinal medial vertical plane and above the centre of gravity of the chassis assembly and of the components carried by this chassis, whereby the assembly can be inclined toward the inner side of the curve by the centrifugal force developed by the vehicle as it moves along the curve.

According to another characteristic feature of the arrangement proposed by this invention, the chassis pivot pins bear on each set of wheels through a linkage system of a type already known per se, comprising a pair of transverse links positioned substantially in a common vertical plane, the upper or main links of both linkage systems being mounted on the corresponding pivot pin of the chassis, and the lower or auxiliary links are pivotally attached to two separate points of the chassis, the outer ends of each link of the front and rear linkage systems being pivotally mounted on the corresponding ends of the vertical support carrying the relevant stub axle.

According to another important feature of the invention the suspension system comprises resilient members mounted between flanges or jaws carried respectively by the adjacent ends of the links connected to the pivot pins, these links acting laterally in opposite directions.

Finally, the chassis may also be connected to each wheel through an adjustable resilient tension and return member attached on the one hand to the vertical support carrying the stub-axle of the relevant wheel and on the other hand to a suitable point of the chassis.

The accompanying drawings forming part of this specification illustrate diagrammatically by way of example a few embodiments of the invention.

In the drawings:

Fig. 1 is an end view of one of the sets of wheels of the vehicle, namely the rear wheels of an automobile constructed in accordance with the teachings of this invention and shown in its straight-drive condition;

Fig. 2 is a more diagrammatical view showing the position assumed by the various components of the arrangement shown in Fig. 1, as the vehicle is driven along a curve having its centre positioned on the right of the drawing;

Fig. 3 is a diagram similar to Fig. 2 showing the front wheels in the same conditions, i. e. steered toward the left of the driver;

Fig. 4 is a fragmentary plan view of the chassis;

Fig. 5 shows in front elevational view the assembly consisting of the two main or upper links of the linkage system of the rear wheels;

Fig. 6 is a corresponding plan view with fragmentary sections showing in particular the common pivot pin of the two upper links, and Fig. 7 is a diagram similar to Fig. 2 showing a modified form of embodiment of the vehicle according to this invention.

Referring to the drawings, the chassis consists of a pair of transverse end structures 1, 2 of semi-circular shape interconnected through a pair of tubular side members 3, 4 mounted on either side of the bottom of the transverse structures 1, 2. These transverse structures themselves consist each of a pair of parallel plates 1a—1b, 2a—2b, also of semi-circular shape and braced on the one hand by a corresponding longitudinal pivot pin 5, 6, these pivot pins being rigidly fastened to these plates near the top thereof, as shown, so as to extend in axial alignment in relation to each other, and on the other hand by a pair of secondary or auxiliary pivot pins 11, 11' and 17, 17' to which reference will be made presently.

The chassis A bears through the front and rear pivot pins 5, 6 on two identical linkage systems, each system comprising a four-sided structure B, B' and C, C' disposed symmetrically with respect to the longitudinal medial vertical plane of the vehicle.

The linkage system B comprises an upper or main link 7, a vertical support 8 carrying the stub axle 9 of the relevant wheel, a lower or secondary link 10; the fourth side of this structure consists of the chassis proper and is shown in chain-dotted lines in the diagrams of the drawings as extending between the pivot pin 11 of link 10 of the rear transverse structure 1, and the pivot pin 5 to which the upper or main link 7 is attached.

The symmetrical linkage system B' of the same set of rear wheels comprises the upper link 7', the vertical support 8' carrying the stub axle 9', the lower link 10', and the fourth side consists of the chassis proper of the vehicle, along the chain-dotted line extending between the pivot pin 11' of the lower link 10' and the pivot pin 5 to which the inner end of the upper link 7' is attached. As will be apparent from the drawings, the inner ends of the upper links of the linkage systems controlling one set of wheels have a common pivot pin so that the wheels 12, 12' are connected to the chassis through a pair of four-sided linkage systems having a common fulcrum on the chassis, the chassis therefore comprising only three pivotal attachments.

The front set of wheels 13, 13' is connected in the same manner to the front transverse structure 2 of the chassis; the four-sided linkage system C consists of the members 14, 15, 16 and also of the chassis portion extending between the fulcrum 17 on the transverse structure 2 and the upper pivot pin 6; the companion linkage system C' comprises the corresponding four-sided assembly 14', 15', 16' and 17', 6, the chassis portions constituting the fourth or inner sides of the linkage systems being also shown in chain-dotted lines in the figure.

The elastic suspension of the vehicle is arranged as follows (see Figs. 1, 5 and 6).

Referring more particularly to Figs. 5 and 6, which show details of the upper or main links belonging to the pair of four-sided linkage systems of a same set of wheels, it will be assumed that the set is the rear one; the upper link 7 is pivotally connected at one end through a pivot pin 18 carried by a vertical, stub-axle supporting member 8, and it is formed at the other end with a yoke portion 19 receiving between its arms the corresponding end 19' of the associated main link 7'. This assembly of link heads is fulcrumed on the pivot pin 5 which, as already set forth, is fast with the rear transverse structure 1 of the chassis A.

Each link head 19, 19' is formed with a pair of projections 20, 21 and 20', 21' forming together, above and beneath the axis of pin 5, a pair of recesses adapted to receive resilient pads 23, 24 consisting in the example shown in the drawings of blocks of elastic material such as rubber, although any other suitable spring, pneumatic or fluid-pressure device may be substituted therefor. Of course, the other set of four-sided pivotal structures is equipped in the same fashion.

The operation of the elastic suspension system broadly described hereinabove is self-explanatory. It is advantageous chiefly in that it precludes the transmission of any major shocks to the suspended members, and notably to the passengers of the vehicle. In fact, the shocks are absorbed or smoothed out by the central resilient members as these are compressed between the heads of the upper links, the length of these links providing a substantial reduction in the amplitude of the shocks and acting laterally so as to avoid any direct reaction on the body.

The pivoted four-sided linkage systems are complemented by springs 25, 25' adjustable for tension (see Figs. 1 and 2) and connecting the stub axle carrying members 8, 8' to the relevant lateral bottom edge of the chassis at 26, 26'; in Fig. 3 these springs carry the reference numbers 27, 27' and are attached to the chassis at 28, 28'. The scope of these springs is on the one hand to moderate the effect of the centrifugal force when the vehicle is driven along a curvilinear path so that the inclination of the wheels will correspond only to the velocity of the vehicle and the radius of the curve, and on the other hand to maintain the vehicle on a straight course by a self-centering action as the vehicle leaves a curved road portion.

The manner in which the vehicle behaves along curvilinear paths will be readily understood from Figs. 1 to 3 of the drawings; the centrifugal force developed under these conditions urges the centre of gravity G of the suspended part of the vehicle toward the outside of the curve, and as this centre of gravity G is positioned beneath the fulcrums 5, 6 this suspended part of the vehicle is tilted angularly in the direction of the arrow, to an extent checked by the springs 25, 25' and 27, 27'; as a result of the concomitant deflections produced by this tilting movement in the four-sided linkage systems, the wheels assume a certain inclination toward the centre of the curve. Thus, the body of the vehicle (not shown), which is rigid with the chassis, will also be inclined inwards of the curve to the same degree as, and simultaneously with, the wheels, this joint inclination occurring automatically and under the influence of the centrifugal force alone. Of course, when the vehicle leaves the curve and resumes its straight course, the force of gravity assisted by the return springs restores the suspended part of the vehicle and the wheels to their normal, original positions.

A portion M in Fig. 1 designates diagrammatically the vehicle engine, but it will be understood that this position is not compulsory.

In Fig. 3, showing a front suspension system with the wheels steered to a certain angle, the steering mechanism proper is not shown, as it can be of any desired and suitable type and is not within the scope of the invention.

It will also be understood that whilst in the forms of embodiment shown and described herein the inner ends or heads of the upper or main links 7, 7', or 14, 14' are pivotally attached through only one pair of axially aligned pins 5, 6, these pins may be replaced by similar pins but disposed in side-by-side relationship, such as the pivot pins 5, 5'' of the diagram of Fig. 7, each pivot pin 5' or 5'' serving as a pivotal fixation member to the corresponding upper link 7, 7' or 14, 14'. In this case, the pivot axes through which the two associated four-sided linkage systems are attached to the chassis, instead of being positioned at the vertex of a triangle, are positioned at the corners of the upper, smaller base of a trapezium.

While the accompanying drawings illustrate a few forms of embodiments of the invention in a diagrammatical manner, it will be readily understood that many details thereof may be modified, and that many changes in the dimensional proportions of the parts may be brought without departing from the spirit and scope of the invention as set forth in the appended claims.

What I claim as new is:

1. A vehicle, notably an automotive vehicle, comprising a frame supporting all the heavy parts of the vehicle and so arranged that its centre of gravity be as low as possible, a pair of longitudinal trunnions carried by said frame and disposed in axial alignment with each other above said centre of gravity, a train of front wheels and a train of rear wheels, each train comprising a pair of wheels each rotatably mounted on a wheel spindle carried by a substantially vertical stub axle, a pair of quadrilateral symmetrical link assemblies positioned substantially in a vertical transverse plane, each quadrilateral link assembly comprising a pair of transverse links of which the upper one is pivoted at one end on the corresponding longitudinal trunnions of the frame and at the other end on the upper end of the stub axle of the relevant wheel, both upper links of the pair of quadrilateral link assemblies forming with each other, when the vehicle is loaded and driven on a straight line, an angle close to but inferior to 180 degrees, whilst the lower link of each quadrilateral link assembly is pivoted at one end on the lower end of said stub axle and at the other end at a point of the frame which is so located that the two pivot axes of the pair of lower links of said pair of quadrilateral link assemblies of a same train of wheels are positioned at the ends of the base of an isosceles triangle having its vertex coincident with the axis of the relevant trunnion, said base passing horizontally above the centre of gravity of the frame, the two quadrilateral link assemblies of each train of wheels being on the other hand so arranged that the common fictitious centre of transverse tilting of the wheels, which is determined at any moment by the change in shape of the aforesaid quadrilateral link assemblies as resulting from the angular displacements of the frame under the influence of the centrifugal force acting upon its centre of gravity, lies above said centre of gravity, whereby when the vehicle is travelling in a curve, said frame will tilt, as its centre of gravity is projected towards the outside of the curve, without allowing the frame oscillation resulting from the action of gravity or of inertia as caused by road irregularities to substantially vary the track of the train of wheels in question.

2. A vehicle, notably an automotive vehicle, comprising a frame supporting all the heavy parts of the vehicle and so arranged that its centre of gravity be as low as possible, a pair of longitudinal trunnions carried by said frame and disposed in axial alignment with each other above said centre of gravity, a train of front wheels and a train of rear wheels, each train comprising a pair of wheels each rotatably mounted on a wheel spindle carried by a substantially vertical stub axle, a pair of quadrilateral symmetrical link assemblies positioned substantially in a vertical transverse plane, each quadrilateral link assembly comprising a pair of transverse links of which the upper one is pivoted at one end on the corresponding longitudinal trunnion of the frame and at the other end on the upper end of the stub axle of the corresponding wheel, the two upper links of the pair of quadrilateral link assemblies of the train of wheels considered forming with each other, when the vehicle is loaded and driven on a straight line, an angle close to but inferior to 180 degrees, whilst the lower link of each quadrilateral link assembly is pivoted at one end on the lower end of said stub axle and at the other end at a point of the frame which is so located that the two pivot axes of the pair of lower links of said pair of quadrilateral link assemblies of a same train of wheels are positioned at the ends of the base of an isosceles triangle having its vertex coincident with the axis of the relevant trunnion, said base passing horizontally above the centre of gravity of the frame, a pair of widened portions formed at the adjacent ends of said upper links above and below the trunnion on which they are pivoted, resilient members interposed between the upper regions of said widened portions, and other resilient members interposed between the lower regions of said widened portions, whereby the variations in the angular divergence between said upper links of a same train of wheels as may be caused by road irregularities and by the load are absorbed by said upper and lower resilient members.

References Cited in the file of this patent

UNITED STATES PATENTS

| 2,186,065 | Fischer | Jan. 9, 1940 |
| 2,260,102 | Freret | Oct. 21, 1941 |

FOREIGN PATENTS

| 602,509 | France | Mar. 20, 1926 |
| 731,964 | Germany | Feb. 18, 1943 |